(12) United States Patent
Aitharaju et al.

(10) Patent No.: US 10,500,765 B2
(45) Date of Patent: Dec. 10, 2019

(54) ONLINE DIE FACE MONITORING

(71) Applicant: GM GLOBAL TECHNOLOGY OPERATIONS LLC, Detroit, MI (US)

(72) Inventors: Venkateshwar R Aitharaju, Troy, MI (US); Nicholas W Pinto, IV, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 15/383,109

(22) Filed: Dec. 19, 2016

(65) Prior Publication Data

US 2018/0169975 A1  Jun. 21, 2018

(51) Int. Cl.
*B29C 70/54* (2006.01)
*B29C 70/48* (2006.01)
*B29C 33/22* (2006.01)

(52) U.S. Cl.
CPC .............. *B29C 33/22* (2013.01); *B29C 70/48* (2013.01)

(58) Field of Classification Search
CPC ......... B29C 33/22; B29C 70/54; B29C 70/48; B29C 2945/76254; B29C 2945/76224; B29C 2945/76461; B29C 2945/76652; B29C 45/768
See application file for complete search history.

(56) References Cited

U.S. PATENT DOCUMENTS

| | | | |
|---|---|---|---|
| 3,986,010 A | 10/1976 | Lankford et al. | |
| 6,165,405 A * | 12/2000 | Harmsen | B29C 33/22 264/272.17 |
| 6,380,549 B1 * | 4/2002 | Oster | B29C 51/46 250/559.42 |
| 7,930,957 B2 | 4/2011 | Travez et al. | |
| 8,136,432 B2 | 3/2012 | Travez et al. | |
| 8,234,897 B2 | 8/2012 | Kuwayama et al. | |
| 8,365,642 B2 | 2/2013 | Travez et al. | |
| 2005/0104017 A1 * | 5/2005 | Kimba | G06T 7/001 250/559.07 |
| 2010/0289190 A1 * | 11/2010 | Kawakami | B29C 43/021 264/496 |

* cited by examiner

*Primary Examiner* — Joseph S Del Sole
*Assistant Examiner* — Mohamed K Ahmed Ali

(57) ABSTRACT

A die face monitoring system may include an upper die having an upper die face and an upper die opening extending towards the upper die face. Similarly, a lower die may include a lower die face and a lower die opening extending towards the lower die face. The lower die face is arranged to confront the upper die face and form a concavity therebetween. Furthermore, a plurality of sensors are mounted on a press, with each sensor corresponding to each one of the upper and lower die openings. Each sensor emits a beam of light towards and receives a reflection from a target surface within the upper and lower die openings in order to calculate a distance thereto.

14 Claims, 2 Drawing Sheets

ONLINE DIE FACE MONITORING

FIELD

The present disclosure relates to a system and method for online monitoring of a die face in a high pressure resin transfer molding operation.

INTRODUCTION

The statements in this section merely provide background information related to the present disclosure and may not constitute prior art.

High pressure resin transfer molding (HP-RTM) of composites involves utilizing high pressures (e.g., 120 bars compared to 20 bars in a standard RTM process) to improve molding cycle time (e.g., 5 mins compared to at least 30 mins in the standard RTM process). However, these high pressures can cause the molds to deflect a significant percentage and can increase the differential displacement at the male and female mold faces. When these clearances exceed a predetermined design thickness, low-resistance flow paths can occur at various locations. These low-resistance flow paths or "race tracking" can lead to unwarranted voids and defects in the final product.

SUMMARY

A die face monitoring system may include an upper die having an upper die face and an upper die opening extending towards the upper die face. Similarly, a lower die may include a lower die face and a lower die opening extending towards the lower die face. The lower die face is arranged to confront the upper die face and form a concavity therebetween. Furthermore, a plurality of sensors are mounted on a press, with each sensor corresponding to each one of the upper and lower die openings. Each sensor emits a beam of light towards and receives a reflection from a target surface within the upper and lower die openings in order to calculate a distance thereto.

A method for monitoring a condition of a die face includes providing a die set having an upper die and a lower die, each of the upper and lower dies having a tapered opening terminating with a target surface. A first beam of light is emitted from a first sensor towards the upper die target surface and a first reflected signal is received therefrom. A second beam of light is emitted from a second sensor towards the lower die target surface and a second reflected signal is received therefrom. A distance is then calculated between the upper die target surface and the lower die target surface.

A die face monitoring system may include a die configured to form a surface of a workpiece. Furthermore, a sensor may be configured to monitor a surface of the die in order to calculate a deflection of the die confronting the surface of the workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
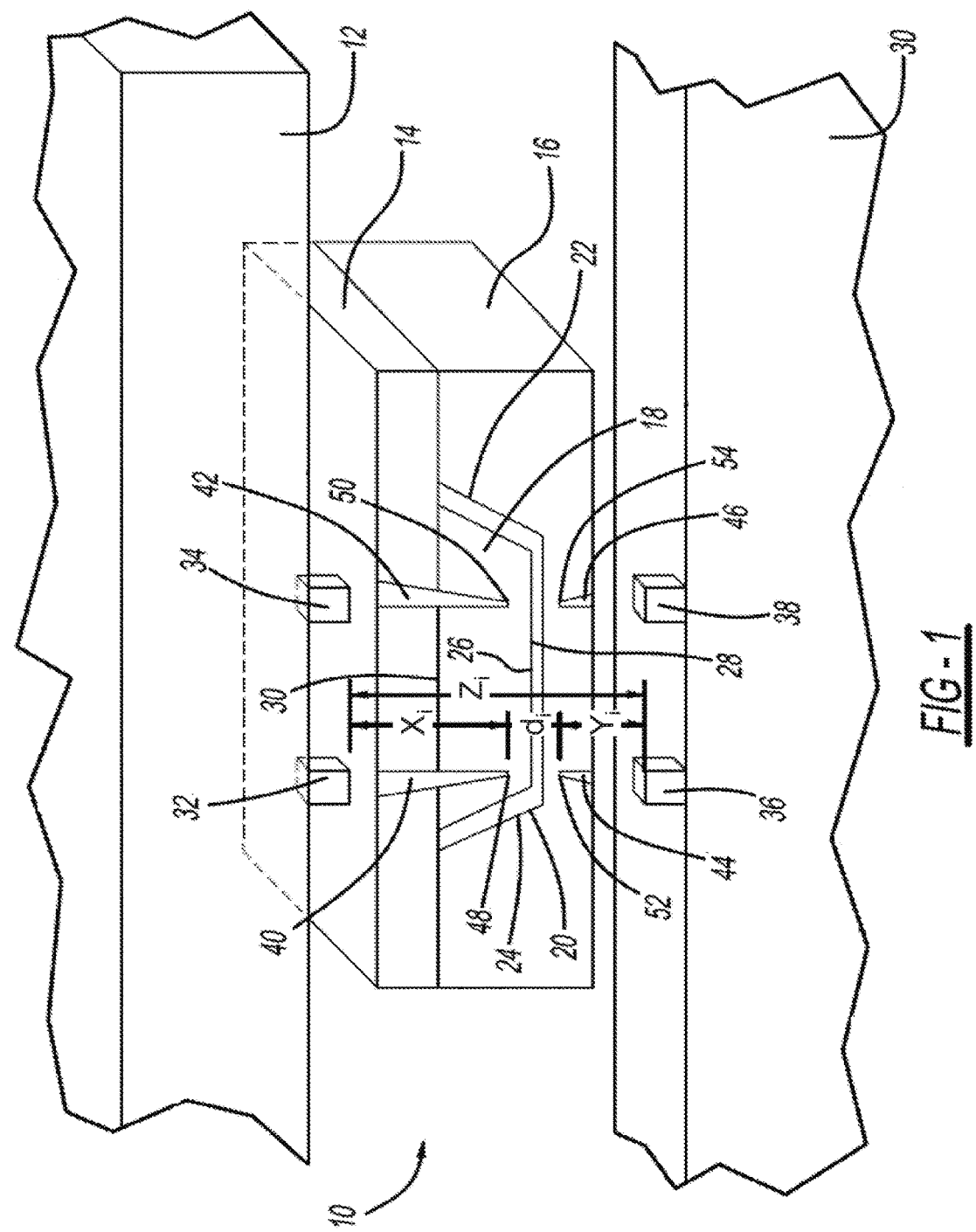
Figure 2:
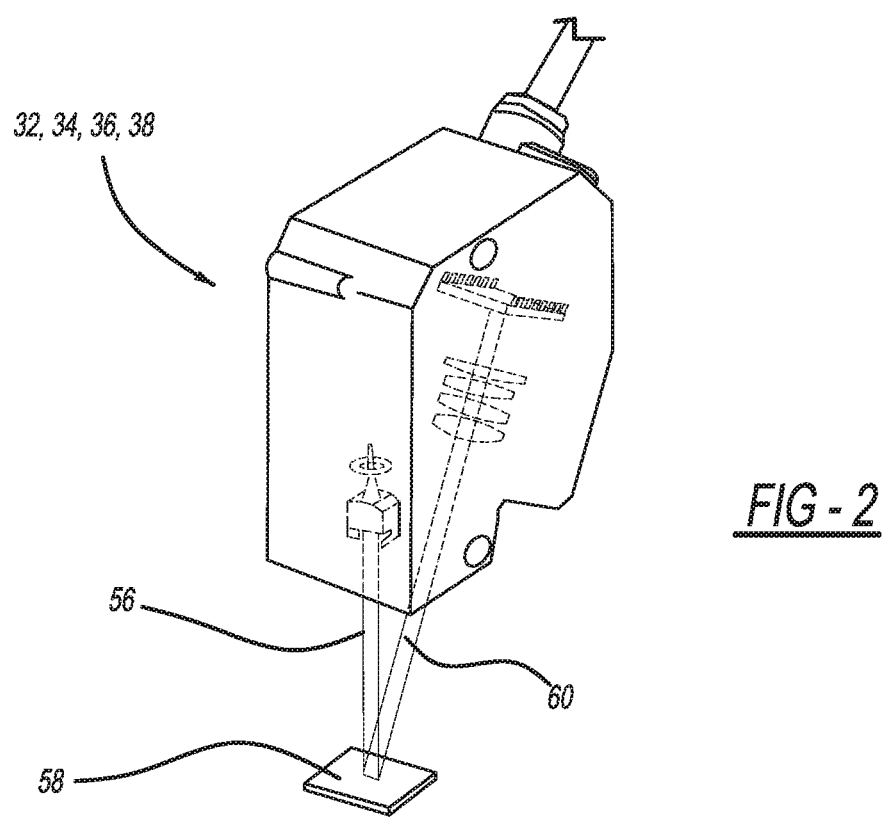

FIG. 1 is a schematic view of an exemplary high pressure resin transfer molding die set according to the present disclosure; and FIG. 2 is an enlarged perspective view of an exemplary sensor for use with the high pressure resin transfer molding die set of FIG. 1.

DETAILED DESCRIPTION

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be modified in alternate applications.

Referring now to FIG. 1, an exemplary high pressure resin transfer molding die set 10 having an online die face monitoring system is depicted within a press 12. While described as a die set for high pressure resin transfer molding (HP-RTM), it should be understood that the online die face monitoring system described herein can be used with any type of out of autoclave manufacturing process including, but not limited to, low pressure resin transfer molding (RTM), same qualified resin transfer molding (SQRTM), vacuum-assisted resin transfer molding (VARTM), and balanced pressure fluid molding. Furthermore, the online die face monitoring system as described herein may be beneficial for use in the automotive and aerospace manufacturing industries; the pulp and metal processing industries; the agricultural, military, appliance, construction, food and beverage, consumer products and medical service industries; and general manufacturing applications.

The HP-RTM die set 10 includes an upper mold die 14, a lower mold die 16, an insert 18, and a fiber preform 20. The lower mold die 16 may have a mold die face 22 that is a mirror image to a lower surface 24 of the fiber preform 20. Similarly, the insert 18 may have a lower mold die face 26 that is a mirror image to an upper surface 28 of the fiber preform 20. In this way, the fiber preform 20 may be arranged within the similarly shaped concavity within the lower mold die 16, with the insert 18 arranged in the similarly shaped concavity of the fiber preform 20. The upper mold die 14 can then be arranged atop the lower mold die 16 to sandwich both the insert 18 and the fiber preform 20 therebetween. As an upper surface 30 of the insert 18 is substantially flat, the upper mold die 14 can take the form of a universal die tool for alternate part designs.

In operation, the preform 20 is arranged between the lower mold die 16 and the upper mold die 14/insert 18. The die set 10 is sealed in a closed position (e.g., within press 12), and then heated. Heated resin is then injected under high pressure into the closed die set 10 in order to impregnate the preform 20. The die set 10 is held at a temperature sufficient to cure the resin and form a workpiece (not shown).

Over time, the mold die face 22 of the lower mold die 16 and the mold die face 26 of the insert 18 may wear, which can lead to incomplete compaction or inconsistent mold fill. Furthermore, this wear may vary across the die faces 22, 26 and may also be difficult to visually identify (i.e., part appears fully dense, but destructive part testing identifies regions of low density). As final part quality directly relies upon proper compaction, it is beneficial to track and identify individual part and trend information related to compaction in real-time.

With reference again to FIG. 1 and further reference to FIG. 2, an online monitoring system can be incorporated into the press 12 in order to continuously measure the distance between the die faces 22, 26 of the molds during compaction, record the measured values, and calculate notable changes in the dimensions. These calculated values are used for online monitoring of defects in the die faces 22, 26. The online monitoring system may also be used to arrive at appropriate changes to the die faces 22, 26 to eliminate any gap differential from the designed thickness. In particular, the online monitoring system incorporates a plurality of sensors 32, 34, 36, 38 removably mounted on the press 12. The sensors 32, 34, 36, 38 can be arranged around the perimeter of the die set 10 and within the interior shape of the designed part, so as to provide a profile of the die faces 22, 26 as established from sensor readings. Various sensors 32, 34 may be arranged on an upper portion of the press 12 and various sensors 36, 38 may be arranged on a lower portion of the press 12. The sensors 32, 34, 36, 38 may be angled towards a corresponding tapered opening 40, 42, 44, 46 in the upper mold die 14, the lower mold die 16, and/or the insert 18. While described as having four sensors 32, 34, 36, 38 angled towards four tapered openings 40, 42, 44, 46, it should be understood that any number of sensors may be used depending on final configuration of the workpiece. Furthermore, the plurality of sensors may be arranged on the exterior of the mold so that mold deflection can be monitored without weakening the mold itself.

Each of the tapered openings 40, 42, 44, 46 may extend over a depth to a flattened bottom portion 48, 50, 52, 54. The flattened bottom portion 48, 50, 52, 54 acts as a reflective target for a light beam emitting from the sensors 32, 34, 36, 38. In this way, the sensor 32, 34, 36, 38 emits the light beam as a sent signal 56, which is in turn, reflected back by a target 58 (i.e., flattened bottom portion 48, 50, 52, 54) as a received signal 60. The tapered shape of the openings 40, 42, 44, 46 is provided as a compact angle that is sized based on the accuracy and strength of the sensor 32, 34, 36, 38. In one example, sensor accuracy is approximately 0.04 mm. As the signal envelop forms a cone, the tapered shape of the openings 40, 42, 44, 46 tends to take on a conical form. As sensor technology advances, however, it is understood that the conical envelop will shrink and thus the size of the opening in the mold can be reduced.

The distance between the sent and received signals 56, 60 of the sensors 32, 34, 36, 38 provides a measurement of die deflection. The deflection of the mold face is approximated to be the measured deflection of the mold nearest the location of the sensor target 58. As the sensor target 58 (i.e., flattened bottom portion 48, 50, 52, 54) is moved closer in proximity to the die face 22, 26, the accuracy increases. However, having the tapered openings 40, 42, 44, 46 too close to the die face 22, 26 can affect the die integrity.

Certain of the values measured may be predetermined in advance of equipment cycling. For example, a distance between a lower surface of the sensor 32, 34 and an upper surface of the sensor 36, 38 is known and designed as distance $Z_i$. Furthermore, a distance between the lower surface of the sensor 32, 34 and the flattened bottom portion 48, 50 of the tapered opening 40, 42 is measured and recorded as distance $X_i$, while a distance between the upper surface of the sensor 36, 38 and the flattened bottom portion 52, 54 of the tapered opening 44, 46 is measured and recorded as distance $Y_i$. The distance between aligned pairs of flattened bottom surfaces (e.g., surfaces 48 and 52, 50 and 54) are calculated as distance $d_i$. The distance $d_i$ is calculated at two conditions: 1) at mold close with no tonnage, $d_{ia}$; and 2) at mold close with tonnage, $d_{ib}$. The difference in the values $d_{ia}$ and $d_{ib}$, provides the clearance between the mold faces above the design thickness (e.g., recorded as δ). The sensor measurements are plotted against the surface profile of the mold (i.e., the value of δ over the domain of the mold surface) using a graphics program and compared with the baseline information to identify the locations with clearance greater than the predetermined thickness. This information can be used to identify potential locations of adjustment for the mold tool. It can also be retrievable information that can be used to identify trends with the molding tools.

The measurement data can then be output to a controller (not shown) for plotting the measured deflection of the die face 22, 26. The measured deflection can be exported as a digital signature of the mold face for each part manufactured. Furthermore, the controller can have an interface with an external device (e.g., a portable computing device) for providing a pass/fail indicator to an operator on a real-time, part-by-part basis. The data can identify not only locations for die face wear, but also provide dimensions for wear so that parts can be manufactured with consistent quality. This can be used to create a preventative maintenance schedule for the mold tools. By understanding the locations on the die faces 22, 26 with deflection different from the designed thickness, adequate steps can be taken to remedy the molds (e.g., welding/grinding). In this way, that the gap between the male and female molds exhibits the designed thickness under the molding conditions. As should be understood, the controller can compare each pressing to the baseline and determine a set of pass/fail criteria for instant testing and sorting of molded components. The controller is also capable of comparing the $n^{th}$ molded component to various baseline components (e.g., components run at cycle 100, 1000, 10000) in order to understand mold wear or drift.

The present online control provides improved quality monitoring of parts during the molding process. The control also provides a digital signature acquisition of die face condition for each of the parts molded for quick and easy remedial measures for correcting the mold face. The system also assists in reducing/eliminating scrap, which in turn, saves on material costs and reduces the likelihood of parts with voids entering the production stream. Furthermore, the advantage to press mounted sensors is that they can be easily moved to accommodate different part geometries and can also identify when a die set shifts within the press.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. For example, while the die set 10 is described as having the upper mold die 14, the lower mold die 16, and the insert 18, certain die sets may only have the upper and lower mold dies. The combinations of features illustrated provide representative embodiments for various applications. Various combinations and modifications of the features consistent with the teachings of this disclosure, however, could be desired for particular applications or implementations.

What is claimed is:

1. A die face monitoring system, comprising:
an upper die having an upper die face and an upper die opening extending towards the upper die face;
a lower die having a lower die face and a lower die opening extending towards the lower die face, the lower die face arranged to confront the upper die face and form a concavity therebetween; and a plurality of sensors mounted on a press, wherein each sensor corresponds to each one of the upper and lower die openings, and wherein each sensor emits a beam of light towards and receives a reflection from a target surface within the upper and lower die openings in order to calculate a distance thereto; an insert arranged between the upper die and the lower die, the insert having an insert opening extending towards an insert face, wherein the insert opening is continuous with one of the upper and lower die openings.

2. The die face monitoring system of claim 1, wherein the upper and lower die openings are tapered.

3. The die face monitoring system of claim 1, further comprising:
a controller for receiving, calculating, and storing the distances between each sensor and surface within the upper and lower die openings.

4. The die face monitoring system of claim 3, wherein each of the upper die openings are aligned with a lower die opening.

5. The die face monitoring system of claim 4, wherein the controller records a distance between the plurality of sensors corresponding to each of the aligned upper and lower die openings.

6. The die face monitoring system of claim 4, wherein the controller records a distance between the sensor and the corresponding target surface.

7. The die face monitoring system of claim 4, wherein the controller records a distance between target surfaces of the upper and lower die openings.

8. The die face monitoring system of claim 7, wherein the distance between target surfaces of the upper and lower die openings is calculated at mold close with no tonnage and at mold close with tonnage.

9. The die face monitoring system of claim 3, wherein the controller compares the distances between each sensor and surface within the upper and lower die openings to a predetermined baseline value.

10. A method for monitoring a condition of a die face, the method comprising: providing a die set having an upper die and a lower die, each of the upper and lower dies having a tapered opening terminating with a target surface;
emitting a first beam of light from a first sensor towards the upper die target surface and receiving a first reflected signal therefrom; emitting a second beam of light from a second sensor towards the lower die target surface and receiving a second reflected signal therefrom; and calculating a distance between the upper die target surface and the lower die target surface, wherein the upper die has an upper die face and the tapered opening in the upper die extends towards the upper die face, and wherein the lower die has a lower die face and the tapered opening in the lower die extends towards the lower die face, the lower die face arranged to confront the upper die face and form a concavity therebetween.

11. The method of claim 10, further comprising:
comparing the distance between the upper die target surface and the lower die target surface to a predetermined baseline value.

12. The method of claim 10, wherein each upper die opening is aligned with a lower die opening, and further comprising:
recording a distance between the plurality of sensors corresponding to each of the aligned upper and lower die openings.

13. The method of claim 10, wherein a graphical user interface provides instantaneous feedback regarding the calculated distance between the upper die target surface and the lower die target surface in comparison with a predetermined baseline distance.

14. The method of claim 12, further comprising:
calculating a distance between target surfaces of the upper and lower die openings at mold close with no tonnage and at mold close with tonnage.

* * * * *